United States Patent [19]
Sakamoto et al.

[11] 4,346,618
[45] Aug. 31, 1982

[54] SPEED CONTROL APPARATUS FOR A VEHICLE

[75] Inventors: Masaaki Sakamoto, Kaga; Shinji Takeuchi, Komatsu, both of Japan

[73] Assignee: Kabushiki Kaisha Komatsu Seisakusho, Tokyo, Japan

[21] Appl. No.: 151,979

[22] Filed: May 21, 1980

[30] Foreign Application Priority Data

May 22, 1979 [JP] Japan .................... 54-62138

[51] Int. Cl.³ .......................... G05G 7/00; G05G 5/16
[52] U.S. Cl. .................. 74/491; 74/473 R; 74/531; 251/232
[58] Field of Search ............ 74/473 R, 491, 531; 251/232

[56] References Cited

U.S. PATENT DOCUMENTS

| | | | |
|---|---|---|---|
| 3,316,773 | 5/1967 | Findlay | 74/491 X |
| 3,795,157 | 3/1974 | Campbell et al. | 74/473 R X |
| 3,893,346 | 7/1975 | Paul | 74/531 X |
| 4,085,833 | 4/1978 | Papasideris | 74/473 R |
| 4,129,046 | 12/1978 | Lemcke, Jr. | 74/473 P |
| 4,138,903 | 2/1979 | Burdette et al. | 74/473 R |

Primary Examiner—Allan D. Herrmann
Attorney, Agent, or Firm—Armstrong, Nikaido, Marmelstein & Kubovcik

[57] ABSTRACT

A speed control apparatus for a vehicle comprising a speed control lever pivotally mounted in every direction to a frame of the vehicle, a console mounted on the frame, the console having formed therein a U-shaped guide groove in which the speed control lever is adapted to move, a pair of levers each pivotally mounted at an intermediate portion thereof to the frame and adapted to be selectively engageable at one end thereof to the speed control lever, a pair of rods each pivotally connected at one end thereof to the respective levers, a turning member rotatably mounted to the frame, the turning member having a pair of arms projecting therefrom in opposite directions from each other relative to the axis thereof, each arm being pivotally connected to the other ends of the respective rods, and a control valve for forward and reverse change-over and speed control of the vehicle connected to one of the arms and adapted to be changed over between forward and reverse positions in accordance with the turning direction of the turning member.

1 Claim, 6 Drawing Figures

SPEED CONTROL APPARATUS FOR A VEHICLE

BACKGROUND OF THE INVENTION

This invention relates to a speed control lever apparatus for road vehicles or the like.

The speed control lever apparatus for road vehicles have different speed shift means in accordance with the types of the transmission system employed therein. For example, in road vehicles employing the planet gear type transmission system, a speed control apparatus in which selection of either forward running or backward running and a required transmission ratio can be obtained by moving a speed control lever along a U-shaped guide groove has been commonly used. Further, in road vehicles employing a hydraulically driven transmission system, a speed control apparatus in which selection of either forward running or backward running and a required transmission ratio can be obtained by moving a speed control lever along a straight guide having a hook-shaped path has been generally used.

Therefore, how to operate the speed control lever varies depending on the type of the speed control apparatuses employed in the transmission system, so that the driver is liable to be at a loss when operating the speed control levers of both types of transmission systems.

SUMMARY OF THE INVENTION

It is therefore an object of the present invention to provide a speed control apparatus for a vehicle wherein a uniform shifting of a speed control lever is obtained irrespective of types of transmission systems employed.

Another object of the present invention is to provide a speed control apparatus for a vehicle wherein a speed control lever is moved in a U-shaped groove of a console for a forward and reverse change-over and speed control of a vehicle having a hydraulically driven transmission.

A further object of the present invention is to provide a speed control apparatus for a vehicle which is capable of providing a good operability of a speed control lever and preventing the driver from becoming bewildered when driving vehicles having different types of transmission systems.

In accordance with an aspect of the present invention, there is provided a speed control apparatus for a vehicle, comprising; a frame of the vehicle; a speed control lever pivotally mounted in every direction at an intermediate portion thereof to said frame; a console mounted on said frame, said console having formed therein a U-shaped guide groove in which said speed control lever is adapted to move; a pair of lever means each pivotally mounted at an intermediate portion thereof to said frame, said pair of lever means being selectively engageable at one-side ends thereof with said speed control lever and pivoted thereby; a pair of rod means each pivotally connected at one end thereof to the other ends of said respective lever means; a turning member rotatably mounted to said frame, said turning member having a pair of arms projecting therefrom in opposite directions from each other relative to the axis of said turning member, each arm being pivotally connected to the other ends of said respective rod means; and control valve means for forward and reverse change-over and speed control of the vehicle, said control valve means being connected to one of said arms and adapted to be changed over between forward and reverse positions in accordance with the turning direction of said turning member.

The above and other objects, features and advantages of the present invention will be readily apparent from the following description taken in conjunction with the accompanying drawings.

DESCRIPTION OF THE PREFERRED EMBODIMENTS

The present invention will now be described below by way of example only with reference to the accompanying drawings.

Figure 1:
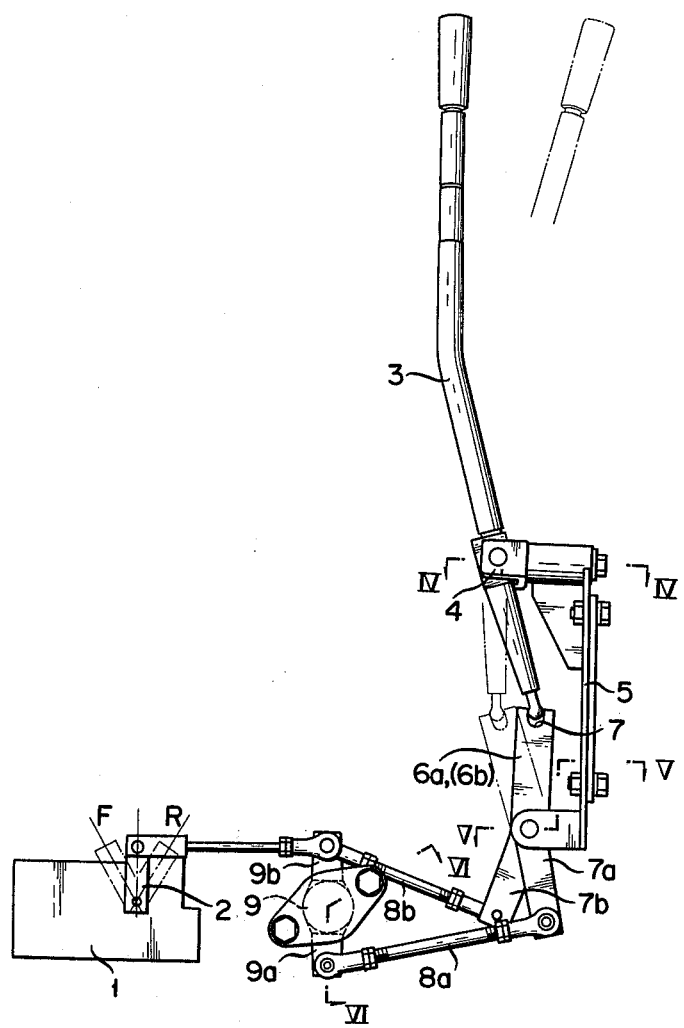
FIG. 1 is a side elevational view of a speed control apparatus for a vehicle according to the present invention.

In FIG. 1, reference numeral 1 denotes a valve for shifting a hydraulically driven transmission gear from its forward running position to its backward running position and vice versa, said valve being adapted to be shifted to forward running position by tilting a lever 2 from its neutral position to the forward side and also to backward running position by tilting the lever 2 from its neutral position to the backward side. Reference numeral 3 denotes a speed control lever located on one side of a driver's seat, the speed control lever having an intermediate portion which is pivotally mounted on a yoke 4. The yoke 4 has a freely rotatable shaft portion 4a which is carried by a framework 5. In brief, the speed control lever 3 is carried through the yoke 4 by the framework 5 so as to be turned freely back and forth and rightwards and leftwards. Reference numerals 6a and 6b indicate left and right side intermediate members which are attached to the leading end of the speed control lever 3 so as to be spaced apart from each other and which are pivotally mounted so as to be turned freely back and forth, each of the intermediate lever members 6a and 6b having a notch 7 formed on the respective leading ends thereof. The leading end of the speed control lever 3 is selectively engageable with either one of the notches 7 of the intermediate lever members 6a and 6b by turning the lever 3 leftward or rightward. The left and right side intermediate lever members 6a and 6b have arms 7a and 7b connected thereto, respectively. The left and right side arms 7a and 7b are connected to rods 8a and 8b, respectively. Reference numeral 9 denotes a turning member having arms 9a and 9b projecting therefrom in opposite directions from each other relative to the axis of the turning member. The arms 9a and 9b are connected to the above-mentioned rods 8a and 8b, respectively. The arm 9b is connected through a rod to the lever 2 for actuating the valve 1. The abovementioned turning member 9 is subjected to a braking force applied by a spring 10 provided on one side thereof through a washer 11. Reference numeral 12 denotes a guide plate or console for guiding the speed control lever 3, said guide plate having a U-shaped guide groove 12a with its bight portion being used as neutral position.

By moving the speed control lever 3 leftwards or rightwards in its neutral bight position, the leading end of the speed control lever 3 is selectively engaged with either one of the notches 7 of the left and right side intermediate lever members 6a and 6b. If and when the speed control lever 3 is moved rightwards (upwards in FIG. 2) in the bight portion and is then moved along the guide groove 12a in FIG. 2 while the leading end thereof is kept engaged with the left side intermediate lever member 6a, the latter is turned about its pivot and the turning member 9 connected thereto is rotated counter-clockwise in FIG. 1 thereby moving the lever 2 to its forward running position.

Figure 2:
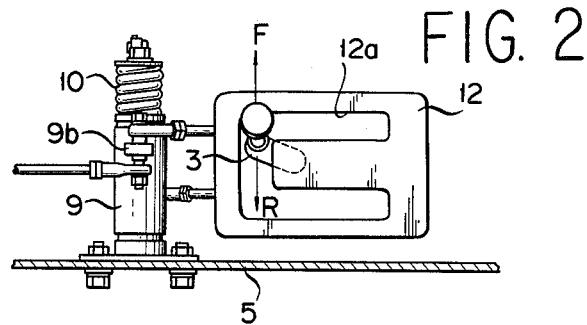
FIG. 2 is a plan view thereof.
Figure 3:
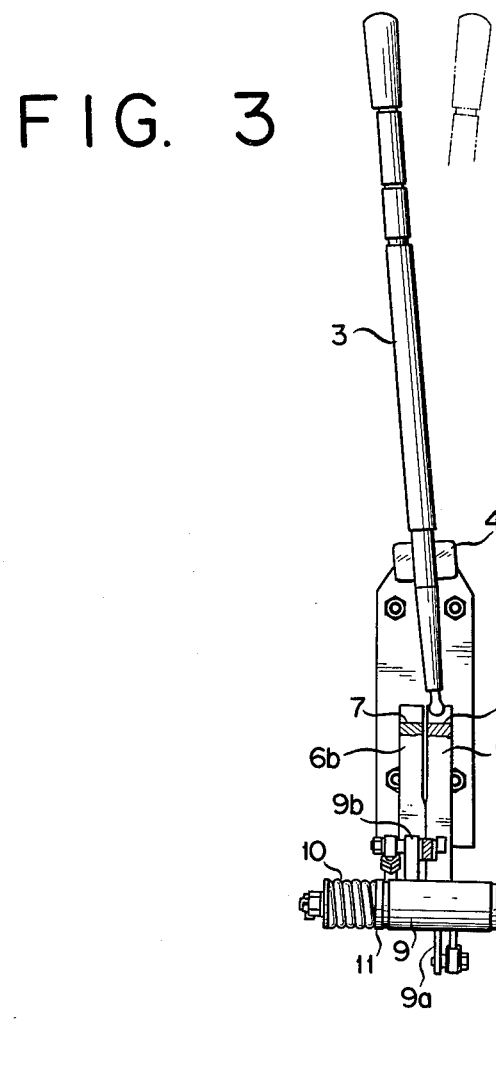
FIG. 3 is a front elevational view thereof.
Figure 4:
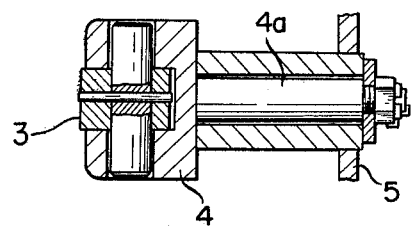
FIG. 4 is a cross-sectional view taken along the line IV—IV of FIG. 1.
Figure 5:
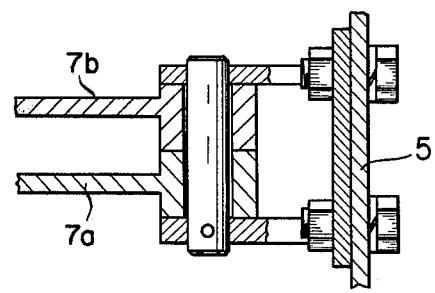
FIG. 5 is a cross-sectional view taken along the line V—V of FIG. 1.
Figure 6:
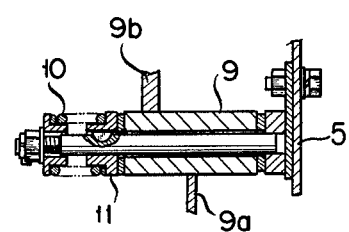
FIG. 6 is a cross-sectional view taken along the line VI—VI of FIG. 1.

When the speed control lever 3 is moved leftwards (downward in FIG. 2) in the bight portion and is then moved along the guide groove 12a in FIG. 2 while the leading end thereof is kept engaged with the right side intermediate lever member 6b, the latter is turned about its pivot and the turning member 9 connected thereto is rotated clockwise in FIG. 1 thereby moving the lever 2 to its backward running position.

Since the present invention is constructed as mentioned above, even if in the hydraulically driven transmission system when the speed control lever is shifted along the U-shaped guide groove as in the case of the planet gear type transmission system, selection of either forward running or backward running can be made and also a required transmission ratio can be obtained so that the shifting operations of the speed control lever 3 can be unified.

It is to be understood that the foregoing description is merely illustrative of a preferred embodiment of the present invention, and that the scope of the present invention is not to be limited thereto, but is to be determined by the scope of the appended claims.

What we claim is:

1. A speed control apparatus for a vehicle, comprising:
    a frame of the vehicle;
    a speed control lever having a ball connector formed thereon at a lower end thereof pivotally mounted in every direction at an intermediate portion thereof to said frame;
    a console mounted on said frame, said console having formed therein a U-shaped guide groove in which said speed control lever is adapted to move;
    a pair of substantially straight levers each pivotally mounted at an intermediate portion thereof to said frame, each of said pair of levers having a notch formed threin at an upper end thereof whereby the ball connector is selectively engageable with either one of the notches as said speed control lever is moved in the guide groove of said console, the selected lever being pivoted thereby;
    a pair of rod means each pivotally connected at one end thereof to the other ends of said respective levers;
    a turning member rotatably mounted to said frame, said turning member having a pair of arms projecting therefrom in opposite directions from each other relative to the axis of said turning member, each arm being pivotally connected to the other ends of said respective rod means;
    spring means for applying a braking force to said turning member against rotation; and
    control valve means for forward and reverse change-over and speed control of the vehicle, said control valve means being connected to one of said arms and adapted to be changed over between forward and reverse positions in accordance with the turning direction of said turning member.

* * * * *